United States Patent Office 3,263,414
Patented August 2, 1966

3,263,414
ENDOTHERMIC REACTIONS FOR COOLING AND PROVIDING FUEL IN SUPERSONIC COMBUSTION
Walter A. Herbst, Union, N.J., assignor to Esso Research and Engineering Company, a corporation of Delaware
No Drawing. Filed Apr. 17, 1964, Ser. No. 360,762
7 Claims. (Cl. 60—35.4)

This invention relates to new and useful improvements in the process of reacting endothermically a chemical substance and using the reaction products as fuel. In general, the present invention concerns the use of a combustion promoter in order to reduce or eliminate the tendency of certain endothermic reaction products to produce a luminous flame when burned in a combustor. In particular, this invention overcomes the problems associated with and caused by luminous flames in combustors burning endothermic reaction products by adding to the full stream entering the combustor, at a point between the position where the endothermic chemical reaction takes place and the combustor, a suitable combustion promoter.

In the prior art, cooling by means of endothermic chemical reactions has been used in many different applications. For example, such reactions have been used to cool nuclear reactors, to cool brake linings, to cool electronic components, to cool devices used in supersonic flight, etc. Also known in the art is the use of endothermic reactions to cool a surface and at the same time to yield a reaction product which is combustible as a fuel in a fuel-burning engine. U.S. Patent 3,067,594, for example, discloses a process wherein a chemical substance is adapted to react endothermically to absorb sufficient quantities of heat to maintain a surface at its safe operating temperature and further, to yield at least one reaction product which is combustible in a fuel-burning engine. An important application of such a process is in the operation of aircrafts at supersonic speeds. A chemical substance is used as a heat sink in order to cool the air frame, the lube oil, and/or various parts of the engine and, in addition, the chemical substance is reacted endothermically thereby absorbing additional heat and also producing reaction products which are subsequently burned in the aircraft engine.

A wide variety of chemical substances undergo endothermic reactions. A portion of these materials are suitable also as fuels. One skilled in the art may, by studying the thermodynamics and the reaction rate of any particular reaction and the physical properties of the compounds which are formed, predict which substances will produce endothermic reaction products useful as fuels. Such a study reveals that many substances are suitable with the exception that when burned, they produce a luminous flame. A luminous flame is undesirable for several reasons. The primary reason is the decrease in combustor life. That is, the heat radiated from the flame to the combustor is increased and the combustor walls run hotter, thereby in many instances, decreasing combustor life. By means of the present invention, the luminosity of the flame in a combustor may be reduced.

The present invention may be practiced in any process which employs a means for carrying out an endothermic reaction and wherein the endothermic reaction products are fed to a combustor and burned with a luminous flame.

Any suitable means for carrying out the endothermic reaction may be employed. For example, the means may be a conventional endothermic reactor equipped with or without a suitable catalyst. The means may be a structure requiring the removal of heat in order to maintain a surface at a safe operating temperature, for example, an aircraft frame or engine. The means may be a turbine blade or a brake lining. The only criteria required is that the means provide a place in which to contain the endothermic reaction.

The combustor employed in the process of the present invention may be any suitable combusting means. In general, it will consist of a confined space in which the combustible materials can be burned with oxygen either as such or as air. The space will have means for introducing the fuel and the oxygen, and for removing the reaction products. The walls enclosing the confined space will consist of materials than can withstand the conditions of combustion (i.e. temperatures, pressures, chemical reactivity of fuels and combustion products). Means may be provided for control of wall temperatures, combustion temperatures, turbulence, concentration of reactants, and temperature uniformity. The combustor may be part of a heat engine (e.g. rocket, turbine, diesel or spark-ignited), a furnace for space heating or power generation, or an industrial process such as steel making or a ceramic kiln. A preferred combustor is that used in a jet engine suitable for operation at supersonic speeds.

A wide range of chemical substances produced as reaction products of endothermic reactions are utilizable as fuels with the exception that they burn with a luminous flame. Examples of such materials are the aromatic hydrocarbons and particularly the polycyclic aromatics and those with alkyl substituent groups. The following table compares the luminosity of these materials with hydrocarbons from which they theoretically may be derived by endothermic reactions. The data are expressed in terms of luminometer number (ASTM designation D1740-60T) which is accepted in the aviation industry as a measure of flame luminosity of aviation turbine fuels. Current aircraft turbines operate on a fuel which has radiation characteristics equivalent to a 50 luminometer number. Flame luminosity decreases as luminometer number increases.

*Luminometer numbers of some hydrocarbons*

| Hydrocarbon: | Luminometer number |
|---|---|
| n-Hexane | 240 |
| 1-hexene | 105 |
| Cyclohexane | 130 |
| Benzene | 11 |
| Methylcyclohexane | 100 |
| Toluene | 3 |
| Decalin | 52 |
| Tetralin | 0 |
| Methylnaphthalene | —14 |
| Ethylbenzene | 2 |
| 1,2-dimethylbenzene | 0 |
| 1,2,4-trimethylbenzene | —5 |

It will be apparent to one skilled in the art that there are many chemical substances which may be suitably employed in the practice of the present invention. Accordingly, it is not intended that the practice be limited to those chemical substances set forth in the above examples.

The combustion promoters which are suitable for use in the process of the present invention function, it is believed, by a mechanism which increases the rate of combustion of the incandescent particles of carbon which are the primary cause of radiation from a flame. By increasing the rate of combustion of these incandescent materials, these combustion promoters thereby reduce the yellow or radiant light from the flame and produce a blue or blue-white flame. Combustion promoters which are suitable include: metallo-organic compounds of iron, cobalt, nickel, copper and lead; organic peroxides; organic ozonides and organic nitrite, nitrate and azide compounds. Examples of these materials are iron carbonyl, ferrocene, tetraethyl lead, acetone peroxide, ditertiary butyl peroxide, cumene peroxide, benzoyl peroxide, amyl nitrate, trinitrotoluene, tetranitromethane and benzyl azide. A preferred oxidation promoter is primary amyl nitrate, because it is commercially available, easily handled, economical, and burns without forming a solid ash. The amount of combustion promoter employed in the process of the present invention will depend upon the extent of luminosity reduction desired, the particular combustion promoter which is employed, and the composition of the fuel stream. In general, however, the concentration will be about 0.01 to about 10.0 volume percent, e.g. 2.0 vol. percent, based upon the fuel to the combustor.

The combustion promoter is added to the fuel stream entering the combustor by any conventional method. Any means which provides an intimate homogeneous mixture of fuel and combustion promoter is suitable. The only criterion is that a uniformly mixed stream is fed to the combustor. For example, the combustion promotor may be stored in a tank which is supplied with a discharge line and a pump and added to the fuel stream at a point between the position where the endothermic reaction takes place and the combustor. For example, the reaction products leaving the place of endothermic reaction may travel by means of a conventional duct to the combustor. The combustion promoter is added to the conventional duct, for example, by means of a pump and any suitable injector. Means may be provided for insuring intimate mixing such as atomizing spray nozzles, mixing vanes or a residence chamber to provide time for mixing and for vaporizaton of the additive to occur.

Several modifications of the present invention may be made without departing from the spirit and the scope thereof; for example, in addition to the endothermic reaction which produces reaction products utilizable as fuels, a second reaction may be employed whereby the combustion promoter is also formed by means of an endothermic reaction. In addition, it is contemplated that in applications where the amount of heat absorbed by the endothermic reaction is relatively small, only a portion of the chemical substance may be reacted endothermically; the remainder, or unreacted portion, being burned as is. Other modifications and variations will become apparent without departing from the spirit and scope of the present invention; therefore, the only limitations imposed should be those which appear in the appended claims.

What is claimed is:
1. In a process wherein a chemical substance undergoes an endothermic chemical reaction, thereby yielding at least one reaction product which has a tendency to burn with a luminous flame, and wherein said reaction product is subsequently burned as a fuel in a combustor, the improvement which comprises adding to said fuel at a point between the position where said endothermic chemical reaction takes place and said combustor, a combustion promoter in an amount sufficient to reduce the luminosity of the flame in said combustor.

2. A process according to claim 1 wherein said combustion promoter is employed in an amount of about 0.01 to 10.0 volume percent based upon the fuel fed to the combustor.

3. A process according to claim 1 wherein said combustion promoter is selected from the group consisting of organo-metallics, organic peroxides, organic ozonides, organic nitrites, organic nitrates and organic azides.

4. A process according to claim 1 wherein said combustion promoter is primary amyl nitrate.

5. A process according to claim 1 wherein said combustion promoter is benzoyl peroxide.

6. A process according to claim 1 wherein said combustor is part of an aircraft engine.

7. In an aircraft operating at supersonic speeds wherein a chemical substance undergoes an endothermic chemical reaction, thereby yielding at least one reaction product which has a tendency to burn with a luminous flame, and wherein said reaction product is subsequently burned as a fuel in an engine of said aircraft, the improvement which comprises adding to said fuel at a point between the position where said endothermic chemical reaction takes place and said engine, a combustion promoter, in an amount sufficient to reduce the luminosity of the flame in said engine.

References Cited by the Examiner
UNITED STATES PATENTS 3,067,594  12/1962  Bland et al. _____ 62—4

LEON D. ROSDOL, *Primary Examiner.*

CARL D. QUARFORTH, *Examiner.*

B. R. PADGETT, *Assistant Examiner.*